US012380774B2

(12) United States Patent
Raj et al.

(10) Patent No.: US 12,380,774 B2

(45) Date of Patent: Aug. 5, 2025

(54) BROADCASTING A LOCATION OF A FIRE BY A SOUNDER DEVICE

(71) Applicant: Honeywell International Inc., Charlotte, NC (US)

(72) Inventors: Nishant Raj, Gaya (IN); Sriramakrishnan Swaminathan, Hosur (IN); Sameer Tripathi, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 29 days.

(21) Appl. No.: 18/369,985

(22) Filed: Sep. 19, 2023

(65) Prior Publication Data

US 2025/0095458 A1 Mar. 20, 2025

(51) Int. Cl.

*G08B 3/10* (2006.01)
*G08B 17/00* (2006.01)
*G10L 13/08* (2013.01)

(52) U.S. Cl.

CPC ........... *G08B 3/1033* (2013.01); *G08B 17/00* (2013.01); *G10L 13/08* (2013.01)

(58) Field of Classification Search

CPC ........ G08B 3/1033; G08B 17/00; G10L 13/08
See application file for complete search history.

(56) References Cited

U.S. PATENT DOCUMENTS 6,317,042 B1 * 11/2001 Engelhorn ............. G08B 25/14 340/288
7,170,396 B2 1/2007 Kalafarski
8,319,625 B2 11/2012 Farley et al.
8,884,772 B1 * 11/2014 Zhang .................... G08B 7/066 340/506
2003/0234725 A1 12/2003 Lemelson et al.
2007/0035407 A1 2/2007 Capowski et al.
2008/0266121 A1 * 10/2008 Ellul ...................... G08B 7/066 340/584
2016/0284174 A1 * 9/2016 Connell, II ............ G08B 7/062
2017/0032660 A1 * 2/2017 El-Mankabady ...... G08B 17/00
2017/0169683 A1 * 6/2017 Ryder ................... G01J 5/0846
2017/0287299 A1 10/2017 Shih et al.
2018/0308326 A1 10/2018 Miwa

FOREIGN PATENT DOCUMENTS

JP 2000020841 A 1/2000
KR 200442208 Y1 * 10/2008
KR 20160126595 A 11/2016
KR 102048176 B1 11/2019

* cited by examiner

*Primary Examiner* — Curtis A Kuntz
*Assistant Examiner* — James E Munion
(74) *Attorney, Agent, or Firm* — Brooks, Cameron & Huebsch, PLLC

(57) ABSTRACT

Devices, methods, and systems for broadcasting a location of a fire are described herein. One device includes a controller configured to receive a report of a fire from a fire sensing device, determine a location of the fire based on the fire sensing device that reported the fire, and transmit a message including the location of the fire to a sounder device for broadcast by the sounder device.

17 Claims, 3 Drawing Sheets

BROADCASTING A LOCATION OF A FIRE BY A SOUNDER DEVICE

TECHNICAL FIELD

The present disclosure relates generally to devices, methods, and systems for broadcasting a location of a fire by a sounder device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms. The alarms can be broadcast by sounder devices, for example.

DETAILED DESCRIPTION

Figure 1:
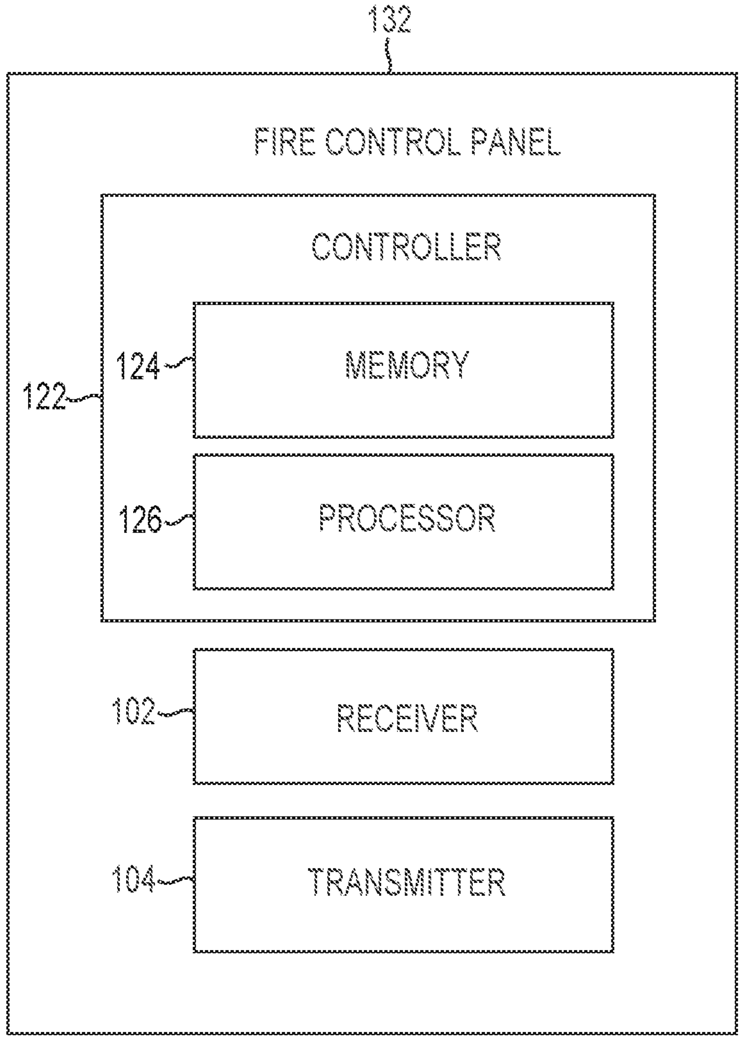
FIG. 1 illustrates a block diagram of a fire control panel in accordance with an embodiment of the present disclosure.

Devices, methods, and systems for broadcasting a location of a fire are described herein. A fire control panel includes a controller. The controller can be configured to receive a report of a fire from a fire sensing device, determine a location of the fire based on the fire sensing device that reported the fire, and transmit a message including the location of the fire to a sounder device for broadcast by the sounder device.

In contrast to previous sounder devices in which an alarm, such as, a tone or a beep are broadcast, sounder devices in accordance with the present disclosure can broadcast a location of a fire. The sounder device can broadcast the location of the fire responsive to receiving a message from a fire control panel, for example. Occupants of the building can hear where the fire is located and avoid that location and/or use an exit that is not blocked by the fire. Accordingly, sounder devices in accordance with the present disclosure may prevent occupants from going towards the fire, which could lead to bodily injury or death.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 132 may reference element "32" in FIG. 1, and a similar element may be referenced as 232 in FIG. 2.

As used herein, "a", "an", or "a number of" something can refer to one or more such things, while "a plurality of" something can refer to more than one such things. For example, "a number of sounder devices" can refer to one or more sounder devices, while "a plurality of sounder devices" can refer to more than one sounder device.

FIG. 1 illustrates a block diagram of a fire control panel 132 in accordance with an embodiment of the present disclosure. The fire control panel 132 includes a controller (e.g., microcontroller) 122.

A fire control panel 132 can receive a notification from a fire sensing device (e.g., fire sensing device 200 in FIG. 2) that a fire is occurring in a facility and trigger a fire response to provide a notification of the fire to occupants of the facility. A fire response can include visual and/or audio alarms from a sounder (e.g., sounder 218 in FIG. 2), for example. A fire response can also notify emergency services (e.g., fire departments, police departments, etc.) In some examples, a fire control panel 132 can be in communication with a plurality of fire sensing devices and a plurality of sounder devices located throughout a facility (e.g., on different floors and/or in different rooms of the facility).

The controller 122 can include a memory 124 and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to confirm a fire in accordance with the present disclosure. For instance, processor 126 can execute the executable instructions stored in memory 124 to receive a report of a fire from a fire sensing device, determine a location of the fire based on the fire sensing device that reported the fire, and transmit a message including the location of the fire to a sounder device for broadcast by the sounder device.

The controller 122 can convert the location of the fire from text to speech using a text to speech algorithm stored in memory 124. For example, the text to speech algorithm can convert the location of the fire sensing device that reported the fire to speech. In a number of embodiments, the text to speech algorithm can divide text into distinct phrases, which can be read with the appropriate intonation while following punctuation and stable structures in the text. Each sentence can be pronounced differently depending on the meaning and emotional tone. The text to speech algorithm can use a built-in dictionary to choose the right pronunciation. If the text to speech algorithm determines a word is missing, the text to speech algorithm can create a transcription using general academic rules. The text to speech algorithm can also check on recordings of speakers to determine which parts of words to accentuate. In some examples, how many 25 millisecond fragments in the compiled transcription can be calculated. The text to speech algorithm describes each fragment with different parameters including which phoneme it is part of, the pace it occupies in it, and which syllable this phoneme belongs to, for example. Then the text to speech algorithm can recreate the appropriate intonation using data from phrases and sentences.

The memory 124 can further store cause and effect rules. The cause and effect rules include commands which can be executed responsive to a cause. For example, the cause can be a report of a fire to the fire control panel 132 and the effect can be transmitting a message including a location of the fire to an output device from the fire control panel 132.

The fire control panel 132 can further include a receiver 102 and a transmitter 104. The receiver 102 can be a wireless receiver configured to receive the report of the fire from the fire sensing device. The transmitter 104 can be a wireless transmitter configured to transmit the message including the location of the fire to the sounder device.

In a number of embodiments, the controller 122 can receive the report of the fire from the fire sensing device via a wired connection between the fire sensing device and the fire control panel 132. The controller 122 can transmit the message including the location of the fire to the sounder device via a wired connection between the fire control panel 132 and the sounder device.

Figure 2:
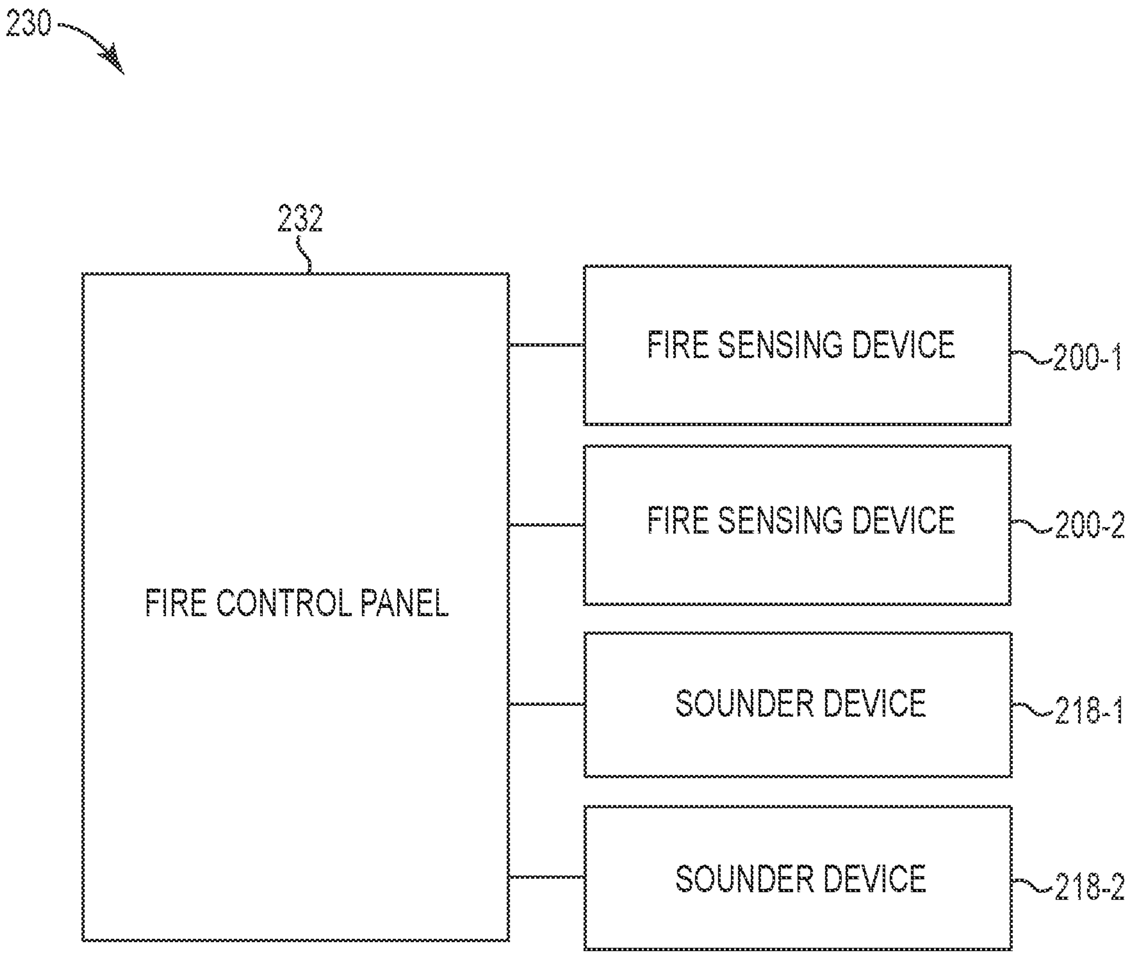
FIG. 2 illustrates a block diagram of a fire alarm system in accordance with an embodiment of the present disclosure.

FIG. 2 illustrates a block diagram of a fire alarm system 230 in accordance with an embodiment of the present disclosure. The fire alarm system 230 can include fire sensing device 200-1, fire sensing device 200-2, a fire control panel 232, a sounder device 218-1, and a sounder device 218-2. Fire control panel 232 can be, for example, fire control panel 132 previously described in connection with FIG. 1.

Fire sensing device 200-1 can measure a quantity of particles in an optical scatter chamber of fire sensing device 200-1, measure a gas level in fire sensing device 200-1, and/or measure a temperature in fire sensing device 200-1, for example. A report of a fire based on the quantity of particles, the gas level, and/or the temperature can be transmitted from fire sensing device 200-1 to the fire control panel 232.

Fire sensing device 200-2 can measure a quantity of particles in an optical scatter chamber of fire sensing device 200-2, measure a gas level in fire sensing device 200-2, and/or measure a temperature in fire sensing device 200-2. A report of a fire based on the quantity of particles, the gas level, and/or the temperature can be transmitted from fire sensing device 200-2 to the fire control panel 232.

The fire control panel 232 can be a monitoring device, a fire detection control system, and/or a cloud computing device of the fire alarm system 230. The fire control panel 232 can be configured to send commands to and/or receive reports from fire sensing device 200-1 and/or fire sensing device 200-2 via a wired or wireless network. For example, the fire control panel 232 can receive a report of a fire from fire sensing device 200-1, determine a location of the fire based on a location of the fire sensing device 200-1 that reported the fire, transmit a message including the location of the fire to sounder device 218-1 and/or sounder device 218-2, and sounder device 218-1 and/or sounder device 218-2 can broadcast the location of the fire responsive to receiving the message from the fire control panel 232. Sounder device 218-1 and/or sounder device 218-2 can include a speaker configured to broadcast the location of the fire in a voice format.

In some examples, the fire control panel 232 can receive a report of a different fire from fire sensing device 200-2. The fire control panel 232 can determine a location of the different fire based on a location of fire sensing device 200-2 that reported the different fire and transmit an additional message including the location of the different fire to sounder device 218-1 and/or sounder device 218-2. Sounder device 218-1 and/or sounder device 218-2 can broadcast the location of the different fire responsive to receiving the additional message from the fire control panel 232.

The fire control panel 232 can receive the particle count, the gas level, and/or the temperature measured by fire sensing device 200-1 and/or the particle count, the gas level, and/or the temperature measured by fire sensing device 200-2. In a number of embodiments, the fire control panel 232 can determine a severity of the fire based on the particle count, the gas level, and/or the temperature measured by fire sensing device 200-1 and determine a severity of the different fire based on the particle count, the gas level, and/or the temperature measured by fire sensing device 200-2. The fire control panel 232 can compare the severity of the fire with the severity of the different fire to determine which one is more severe. For example, the fire may be more severe than the different fire because the fire is producing more gas than the different fire.

Sounder device 218-1 and/or sounder device 218-2 can broadcast the location of the fire prior to broadcasting the location of the different fire responsive to the severity of the fire being greater than the severity of the different fire. In some examples, sounder device 218-1 and/or sounder device 218-2 may broadcast the location of the different fire prior to broadcasting the location of the fire responsive to the severity of the different fire being greater than the severity of the fire. Sounder device 218-1 and/or sounder device 218-2 can also broadcast the severity of the fire and/or the severity of the different fire.

The fire control panel 232 can determine whether a location of sounder device 218-1 or a location of sounder device 218-2 is closer to the location of the fire. The fire control panel 232 can transmit the message including the location of the fire to sounder device 218-1 responsive to the location of the sounder device 218-1 being closer to the location of the fire or transmit the message including the location of the fire to sounder device 218-2 responsive to the location of sounder device 218-2 being closer to the location of the fire.

In a number of embodiments, the fire control panel 232 can determine sounder device 218-1 and/or sounder device 218-2 is within a particular distance from the location of the fire. For example, the fire control panel 232 can transmit the message including the location of the fire to sounder device 218-1 responsive to the sounder device 218-1 being within the particular distance from the location of the fire.

Sounder device 218-1 and/or sounder device 218-2 can transmit a notification to the fire control panel 232 responsive to broadcasting the location of the fire. Sounder device 218-1 and/or sounder device 218-2 can emit a sound prior to broadcasting the location of the fire. For example, sounder device 218-1 can emit an alarm, for example, a tone or beeping sound.

The networks described herein can be a network relationship through which fire sensing device 200-1, fire sensing device 200-2, sounder device 218-1, sounder device 218-2, and/or fire control panel 232 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to fire sensing device 200-1, fire sensing device 200-2, sounder device 218-1, sounder device 218-2, and/or fire control panel 232 via a wired or wireless network.

As used herein, a "network" can provide a communication system that directly or indirectly links two or more computers and/or peripheral devices and allows, for example, a fire control panel 232 to access data and/or resources on fire sensing device 200-1 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

Figure 3:
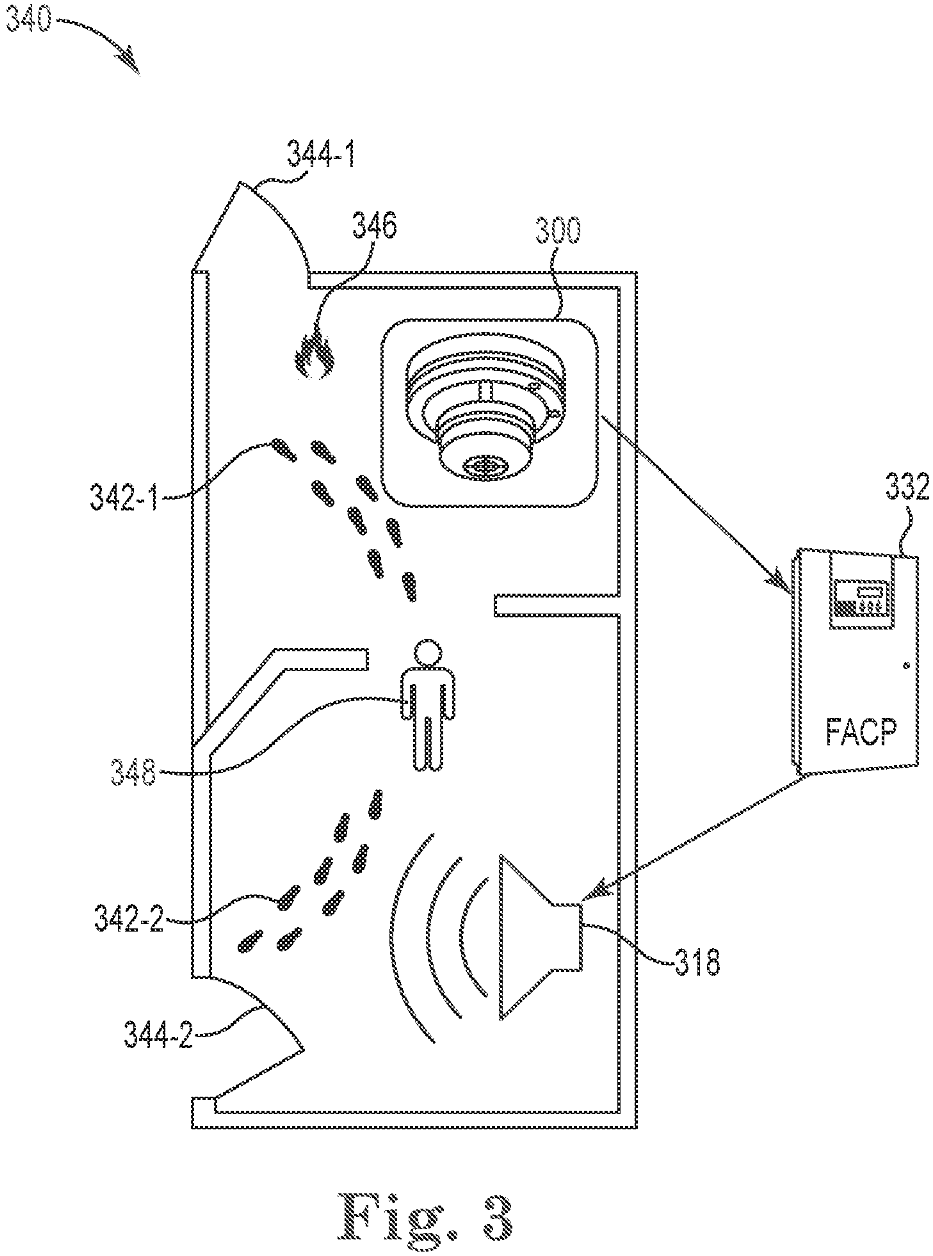
FIG. 3 is an illustration of broadcasting a location of a fire by a sounder device in accordance with an embodiment of the present disclosure.

FIG. 3 is an illustration of broadcasting a location of a fire 346 by a sounder device 318 in accordance with an embodiment of the present disclosure. A building 340 can include a fire sensing device 300, a fire control panel 332, and a sounder device 318.

Fire sensing device 300 can include an optical scatter chamber, a gas sensor, and/or a temperature sensor. The fire sensing device 300 can be configured to measure a quantity of particles inside the optical scatter chamber of the fire sensing device 300, a gas level in the fire sensing device 300, and/or a temperature in the fire sensing device 300. In a number of embodiments, the optical scatter chamber can include a transmitter light-emitting diode (LED) and a receiver photodiode to measure the quantity of particles within the optical scatter chamber. The fire sensing device 300 can detect and report a fire 346 to the fire control panel 332 responsive to the quantity of particles being greater than a baseline quantity, the gas level being greater than a baseline gas level, and/or the temperature being greater than a baseline temperature.

The fire control panel 332 can determine the location of fire 346 based on the location of fire sensing device 300, which reported fire 346. The fire control panel 332 can transmit the location of fire 346 to sounder device 318.

In some examples, the sounder device 318 can be one of a number of output devices activated by the fire control panel 332 responsive to detecting the fire 346. Other output devices can include a speaker, an air vent, a relay, a door, or an elevator, for example.

The sounder device 318 can receive the location of fire 346 from the fire control panel 332 and broadcast the location of fire 346. For example, the sounder device 318 can broadcast the exit fire 346 is located near, the room number fire 346 is located in, and/or the level fire 346 is located on. An occupant 348 can hear the location of fire 346. Knowing the fire 346 is located near exit 344-1 and/or in the room next to occupant 348, the occupant 348 can determine to take path 342-2 towards exit 344-2 instead of path 342-1 towards exit 344-1. In some examples, the sounder device 318 can transmit a notification that the sounder device 318 broadcast the location of the fire 346 to the fire control panel 332 responsive to broadcasting the location of the fire 346.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A fire control panel, comprising:

a controller configured to:

- receive a report of a fire from a fire sensing device;
- determine a location of the fire based on the fire sensing device that reported the fire;
- transmit a message including the location of the fire to a sounder device for broadcast by the sounder device;
- receive a report of a different fire from a different fire sensing device;
- determine a location of the different fire based on the different fire sensing device that reported the different fire;
- transmit an additional message including the location of the different fire to the sounder device for broadcast by the sounder device; and
- determine a severity of the fire and a severity of the different fire, wherein the sounder device broadcasts the location of the fire prior to broadcasting the location of the different fire responsive to the severity of the fire being greater than the severity of the different fire and broadcasts the location of the different fire prior to broadcasting the location of the fire responsive to the severity of the different fire being greater than the severity of the fire.

2. The fire control panel of claim 1, wherein the controller is configured to convert the location of the fire from text to speech.

3. The fire control panel of claim 2, wherein the message includes the converted location of the fire.

4. The fire control panel of claim 1, further comprising a wireless receiver configured to receive the report of the fire from the fire sensing device.

5. The fire control panel of claim 1, further comprising a wireless transmitter configured to transmit the message including the location of the fire to the sounder device.

6. The fire control panel of claim 1, wherein the controller is configured to receive the report of the fire from the fire sensing device via a wired connection between the fire sensing device and the fire control panel.

7. The fire control panel of claim 1, wherein the controller is configured to transmit the message including the location of the fire to the sounder device via a wired connection between the fire control panel and the sounder device.

8. A method of providing a location of a fire, comprising:

receiving, by a fire control panel, a report of a fire from a fire sensing device;

determining, by the fire control panel, a location of the fire based on the fire sensing device that reported the fire;

transmitting a message including the location of the fire from the fire control panel to a sounder device;

receiving, by the fire control panel, a report of a different fire from a different fire sensing device;

determining, by the fire control panel, a location of the different fire based on the different fire sensing device that reported the different fire;

transmitting an additional message including the location of the different fire from the fire control panel to the sounder device;

determining, by the fire control panel, a severity of the fire and a severity of the different fire; and broadcasting, by the sounder device, the location of the fire prior to broadcasting the location of the different fire responsive to the severity of the fire being greater than the severity of the different fire and broadcasting the location of the different fire prior to broadcasting the location of the fire responsive to the severity of the different fire being greater than the severity of the fire.

9. The method of claim 8, further comprising broadcasting, by the sounder device, the location of the fire in a voice format.

10. The method of claim 8, further comprising broadcasting, by the sounder device, the severity of the fire and/or the severity of the different fire.

11. The method of claim 8, further comprising:

measuring a particle count, a gas level, or a temperature at the fire sensing device that reported the fire;

determining, by the fire control panel, the severity of the fire based on the particle count, the gas level, or the temperature measured by the fire sensing device that reported the fire;

measuring a particle count, a gas level, or a temperature at the different fire sensing device that reported the different fire; and determining, by the fire control panel, the severity of the fire based on the particle count, the gas level, or the temperature measured by the different fire sensing device that reported the different fire.

12. A fire control system, comprising:

a fire sensing device configured to transmit a report of a fire;

a different fire sensing device configured to transmit a report of a different fire;

a fire control panel configured to:

receive the report of the fire;

determine a location of the fire based on the fire sensing device that reported the fire;

transmit a message including the location of the fire;

receive the report of the different fire;

determine a location of the different fire based on the different fire sensing device that reported the different fire;

transmit an additional message including the location of the different fire; and determine a severity of the fire and a severity of the different fire; and a sounder device configured to:

receive the message including the location of the fire;

receive the additional message including the location of the different fire;

broadcast the location of the fire prior to broadcasting the location of the different fire responsive to the severity of the fire being greater than the severity of the different fire; and broadcast the location of the different fire prior to broadcasting the location of the fire responsive to the severity of the different fire being greater than the severity of the fire.

13. The system of claim 12, wherein the sounder device includes a speaker configured to broadcast the location of the fire.

14. The system of claim 12, wherein:

the system includes an additional sounder device; and the fire control panel is configured to:

determine whether a location of the sounder device or a location of the additional sounder device is closer to the location of the fire;

transmit the message including the location of the fire to the sounder device responsive to the location of the sounder device being closer to the location of the fire; and transmit the message including the location of the fire to the additional sounder device responsive to the location of the additional sounder device being closer to the location of the fire.

15. The system of claim 12, wherein the fire control panel is configured to:

determine the sounder device is within a particular distance from the location of the fire; and transmit the message including the location of the fire to the sounder device responsive to the sounder device being within the particular distance from the location of the fire.

16. The system of claim 12, wherein the sounder device is configured to transmit a notification to the fire control panel responsive to broadcasting the location of the fire.

17. The system of claim 12, wherein the sounder device is configured to emit a sound prior to broadcasting the location of the fire.

* * * * *